May 27, 1947.  W. A. LUTZ  2,421,211
SPREADING ATTACHMENT
Filed Nov. 2, 1944  3 Sheets-Sheet 2
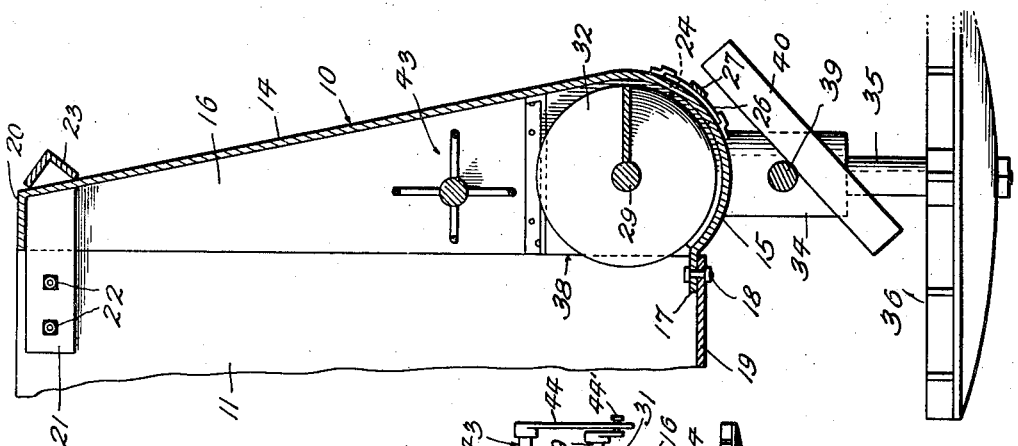
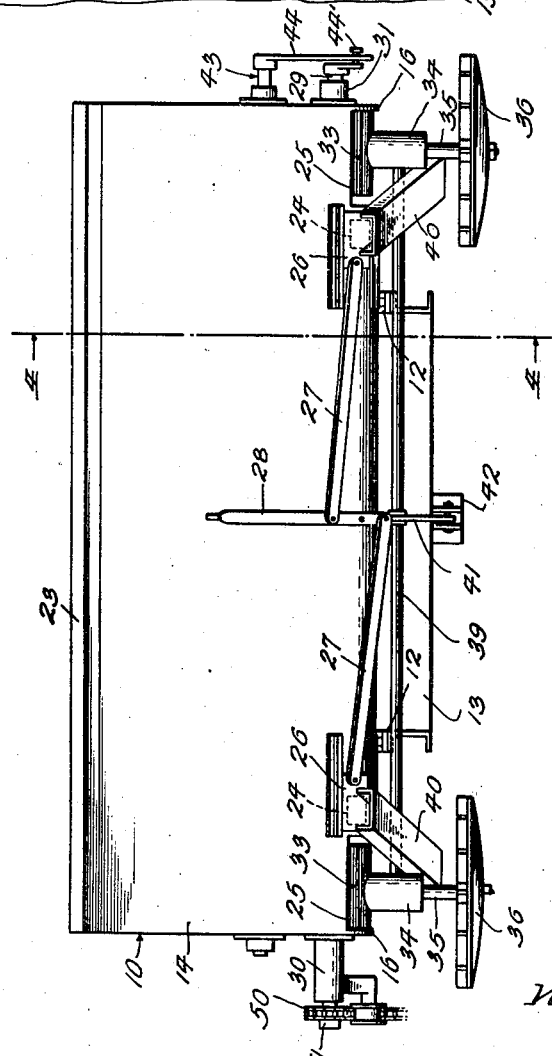
Inventor
W. A. Lutz May 27, 1947.  W. A. LUTZ  2,421,211
SPREADING ATTACHMENT
Filed Nov. 2, 1944   3 Sheets-Sheet 3
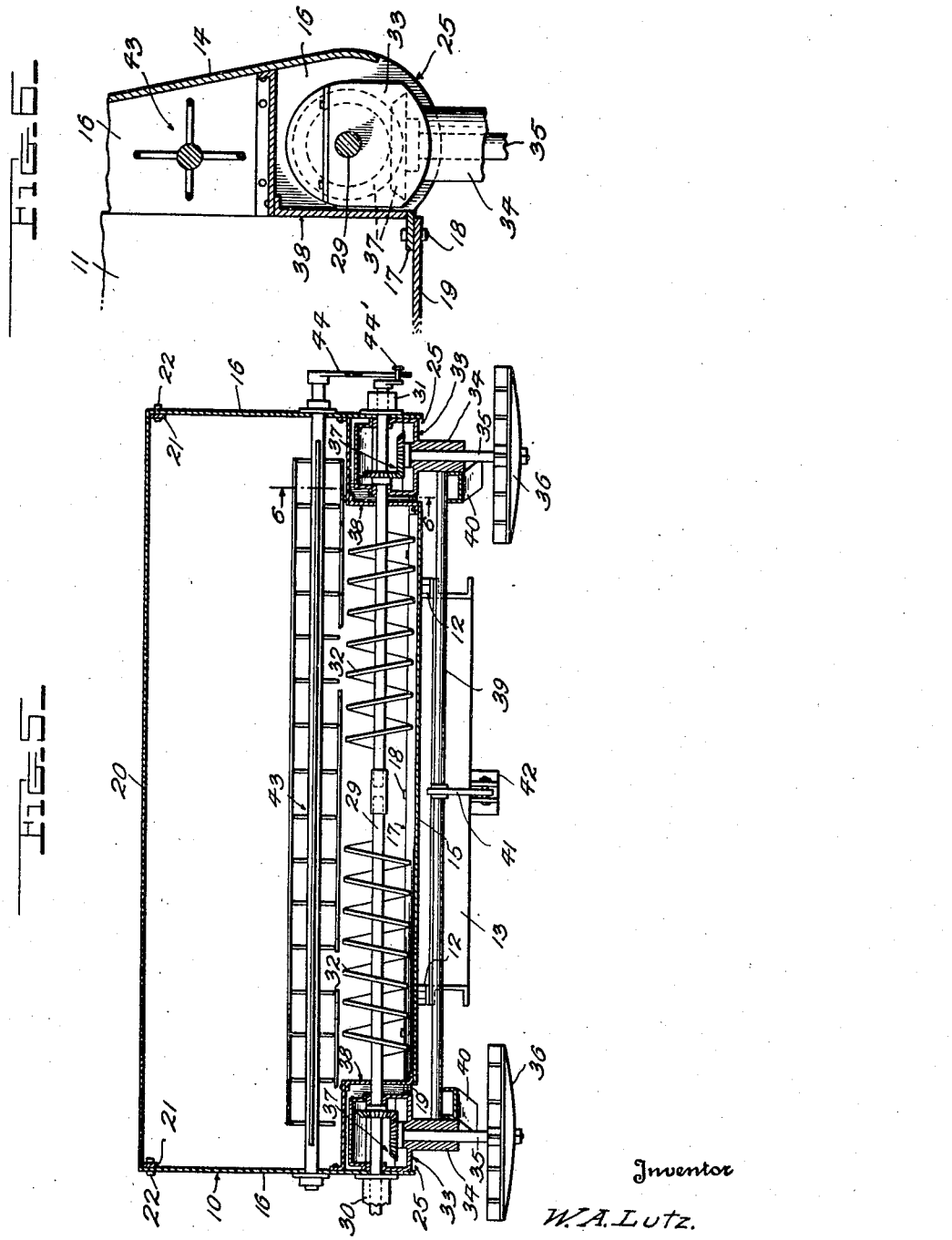
Inventor
W. A. Lutz.

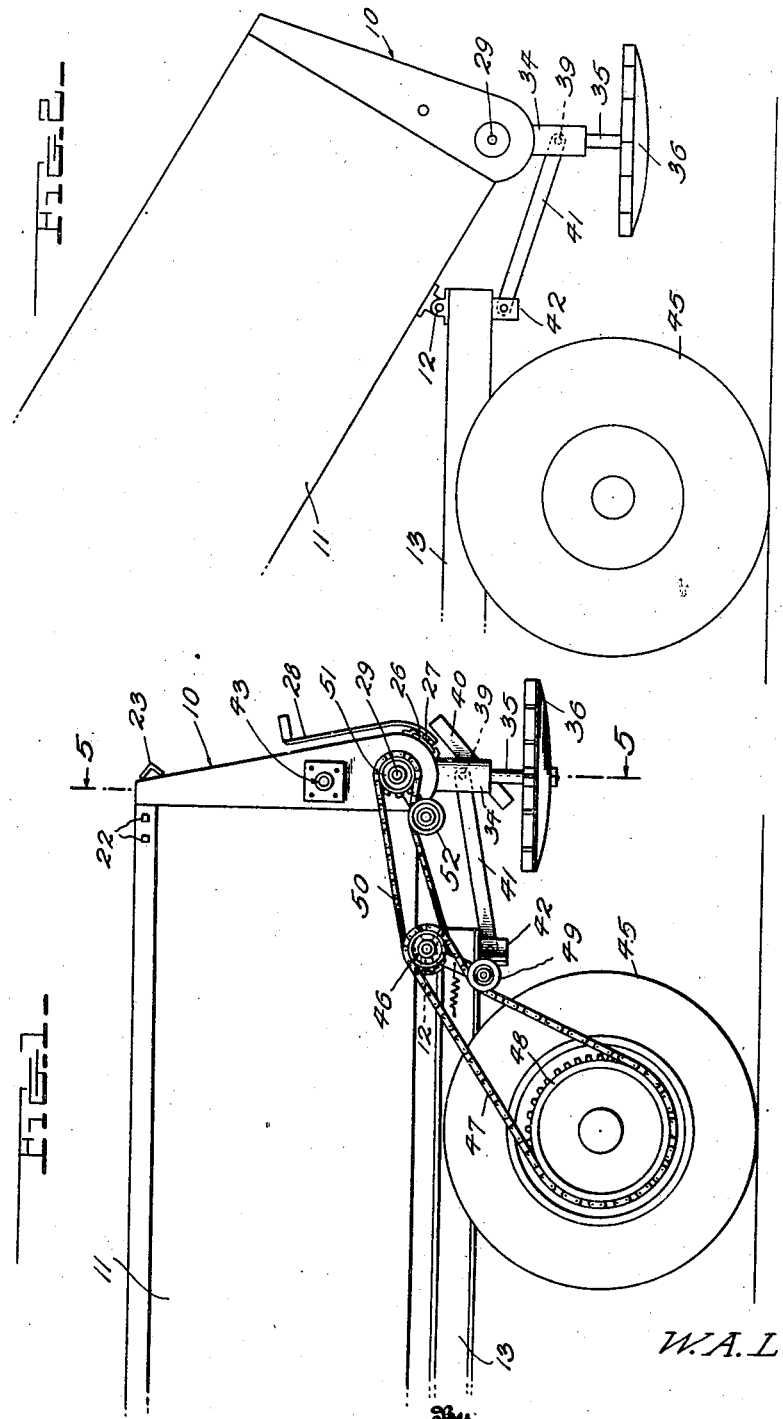

Patented May 27, 1947

2,421,211

UNITED STATES PATENT OFFICE 2,421,211

SPREADING ATTACHMENT

Wilmer Albert Lutz, Bucyrus, Ohio

Application November 2, 1944, Serial No. 561,589

6 Claims. (Cl. 275—8)

The invention aims to provide a new and improved attachment for a truck body, for converting the truck into an effective spreader for lime, fertilizer or other material, and for permitting the same truck to be used to haul the material to the destination at which the spreading is to be done.

The invention further aims to provide an attachment of the class set forth which is particularly adaptable for use with the bodies of dump trucks, whereby inclination of the truck body will feed the material to the attachment, and the invention includes means whereby the distributing disks for the material are held in horizontal planes regardless of the extent to which the truck body be tilted.

A still further object is to provide an attachment which will be rather simple and inexpensive, yet efficient and desirable.

Figure 1 of the accompanying drawings is a side elevation showing the attachment operatively mounted upon a truck.

Figure 2 is a diagram showing more particularly the manner in which the spreading disks are held in horizontal planes when the truck body is tilted.

Figure 3 is a rear elevation.

Figure 4 is an enlarged sectional view on line 4—4 of Fig. 3.

Figure 5 is a vertical sectional view on line 5—5 of Fig. 1.

Figure 6 is an enlarged vertical section on line 6—6 of Fig. 5.

The general construction shown in the drawings may be considered as preferred, and while this construction will be rather specifically described, variations may of course be made within the scope of the invention as claimed.

A casing 10 is provided to close the rear end of a truck body 11, taking the place temporarily of the usual tail-gate. The body 11 is tiltably mounted at 12 upon the chassis frame 13 in the usual manner.

The casing 10 is open at its front to receive material from the truck body, and said casing comprises a back wall 14, a channeled bottom 15, and end walls 16. The front end of the bottom 15 is provided with a forwardly projecting flange 17 to be secured by bolts 18 upon the bottom 19 of the truck body 11, and the upper edge of the back wall 14 is preferably formed with a reinforcing flange 20. Directly under this flange, two forwardly projecting arms 21 are secured to the end walls 16, to be secured by bolts 22 to the sides of the body 11, thus temporarily, yet rigidly connecting the casing with the body. Along its upper portion, the back wall 14 may be reinforced by an angle 23 welded or otherwise secured thereto.

The bottom 15 is formed with material outlets 24 spaced inwardly from the end walls 16, and is also formed with relatively large openings 25 between said outlets and end walls, for a purpose to appear. Suitably guided gates 26 are provided for the outlets 24, said gates being linked at 27 to an operating lever 28 which may be held in adjusted position in any desired manner.

A horizontal shaft 29 extends over the casing bottom 15 from one end wall 16 to the other, and is mounted in appropriate bearings 30 and 31 carried by said end walls. This shaft carries worms 32 for feeding the material along the bottom 15 toward the outlets 24. Two gear casings 33 are pivotally mounted upon the shaft 29 at the inner sides of the end walls 16, said gear casings having downwardly projecting vertical bearings 34 which extend through the openings 25, which openings are large enough to allow the bearings 34 to remain vertical while the casing 10 tilts with the truck body, as diagrammatically seen in Fig. 2. The bearings 34 carry vertical shafts 35 having spreading disks 36 on their lower ends, and appropriate gearing 37 in the casings 33, connects the shaft 29 with said shafts 35. Appropriate hoods 38 are secured in the lower corners of the casing 10 and extend over the gear casings 33 and the openings 25, to prevent leakage of material through these openings.

A horizontal rod 39 extends between the bearings 34 and is welded or otherwise secured thereto, and two chutes 40 for guiding the material to the disks 36 from the outlets 24, may be welded or otherwise secured to this rod and to said bearings 34. A link 41 is connected with the central portion of the rod 39 and is adapted for pivotal connection with an appropriate bracket 42 on the truck chassis frame 13, to hold the bearings 34 in vertical positions while the truck body is tilted, and thus hold the spreading disks 36 horizontal.

An appropriate agitator 43 is mounted in the casing 10 above the shaft 29, one end of said agitator having a longitudinally slotted arm 44, the slot of which is engaged by a crank 44' on said shaft 29, to oscillate said agitator. The shaft 29 is driven from one of the rear wheels 45 of the truck. In the present disclosure, a twin sprocket 46 is mounted on the chassis frame 13 in alinement with the body pivots 12, said twin sprocket being driven by a chain 47 from a sprocket 48 suitably secured to the wheel 45. A spring-actuated tightener 49 is shown for the chain 47. The twin sprocket 46 drives a chain 50 which is trained around a sprocket 51 on the shaft 29, and an idler 52 is preferably provided for the lower reach of said chain 50. By this arrangement of sprocket and chains, etc., both chains will remain operatively tight regardless of the position to which the truck body 11 may be tilted.

From the foregoing, taken in connection with the accompanying drawings, it will be seen that novel and advantageous structure has been provided for attaining the objects of the invention. While preferences have been disclosed, attention is again invited to the possibility of making variations within the scope of the invention as claimed.

I claim:

1. A spreading attachment comprising a casing to close the rear end of a dump truck body, said casing having an open front and comprising a back wall, a bottom and end walls, said bottom having material outlets spaced inwardly from said end walls, a horizontal shaft rotatably supported by said end walls near said bottom and having means whereby it may be driven, said shaft having means for feeding material along said bottom to said outlets, vertical bearings under said shaft, means pivotally suspending said bearings from said shaft near said end walls, said bottom having openings through which said bearings extend, hoods over these openings to prevent leakage of material therethrough, said openings being sufficiently large to permit said casing to tilt while said bearings remain vertical, vertical shafts mounted in said bearings and having spreading disks on their lower ends, gearing connecting said vertical shafts with said horizontal shaft, means connected with said bearings for holding them substantially vertical while said casing tilts with the dump body, and means for conducting material from said outlets to said spreading disks.

2. A spreading attachment comprising a casing to close the rear end of a dump truck body, said casing having an open front and comprising a back wall, a bottom and end walls, said bottom having material outlets spaced inwardly from said end walls, a horizontal shaft rotatably supported by said end walls near said bottom and having means whereby it may be driven, said shaft having means for feeding material along said bottom to said outlets, gear casings through which said shaft extends, said gear casings being located at the inner sides of said end walls and having downwardly projecting bearings, said bottom having openings through which said bearings extend, these openings being sufficiently large to permit the first mentioned casings to tilt while said bearings remain vertical, hoods over said gear casings and secured to said first mentioned casing to prevent leakage of material through said openings, vertical shafts mounted in said bearings and having spreading disks on their lower ends, gearing in said gear casings connecting said vertical shafts with said horizontal shaft, means connected with said bearings for holding them substantially vertical while said first mentioned casing tilts with the dump body, and means for conducting material from said outlets to said spreading disks.

3. A spreading attachment comprising a casing to close the rear end of a dump truck body, said casing having an open front and comprising a back wall, a bottom and end walls, said bottom having material outlets spaced inwardly from said end walls, a horizontal shaft rotatably supported by said end walls near said bottom and having means whereby it may be driven, said shaft having means for feeding material along said bottom to said outlets, vertical bearings under said shaft, means pivotally suspending said bearings from said shaft near said end walls, said bottom having openings through which said bearings extend, hoods over these openings to prevent leakage of material therethrough, said openings being sufficiently large to permit said casing to tilt while said bearings remain vertical, vertical shafts mounted in said bearings and having spreading disks on their lower ends, gearing connecting said vertical shafts with said horizontal shaft, a horizontal rod extending between and secured to said bearings, a link connected to said rod and adapted for connection with the truck to hold said bearings substantially vertical while said casing tilts with the dump body, and means for conducting material from said outlets to said spreading disks.

4. A spreading attachment comprising a casing to close the rear end of a dump truck body, said casing having an open front and comprising a back wall, a bottom and end walls, said bottom having a material outlet, a horizontal shaft rotatably supported in said casing near said bottom and having means whereby it may be driven, said shaft having means for feeding material to said outlet, a vertical bearing under said shaft, means pivotally suspending said bearing from said shaft, said bottom having an opening through which said bearing extends, a hood over said opening to prevent leakage of material therethrough, said opening being sufficiently large to permit said casing to tilt while said bearing remains vertical, a vertical shaft mounted in said bearing and having spreading means on its lower end to receive material discharged from said outlet, gearing connecting said vertical shaft with said horizontal shaft, and means connected with said bearing for holding it substantially vertical while said casing tilts with the dump body.

5. A spreading attachment comprising a casing to close the rear end of a dump truck body, said casing having an open front and comprising a back wall, a bottom and end walls, said bottom having a material outlet, a horizontal shaft rotatably supported in said casing near said bottom and having means whereby it may be driven, said shaft having means for feeding material to said outlet, a gear casing through which said shaft extends, said gear casing having a downwardly projecting bearing, said bottom having an opening through which said bearing extends, said opening being sufficiently large to permit the first mentioned casing to tilt while said bearing remains vertical, a hood over said gear casing and secured to said first mentioned casing to prevent leakage of material through said opening, a vertical shaft mounted in said bearing and having spreading means on its lower end to receive material discharged from said outlet, gearing in said gear casing connecting said vertical shaft with said horizontal shaft, and means connected with said bearing for holding it substantially vertical while said first mentioned casing tilts with the dump body.

6. A spreading attachment comprising a casing to close the open rear end of a dump truck body and to confine the material in said body, said casing having a bottom provided with a material outlet, a horizontal shaft extending through and rotatably mounted on said casing near its bottom and having means whereby it may be driven, means on a portion of the shaft within said casing for feeding material to said outlet, a vertical bearing suspended from a portion of said shaft, a vertical shaft in said bearing, gearing for driving said vertical shaft from said horizontal shaft, spreading means on the lower end of said vertical shaft to receive material discharged from said outlet, and a link pivotally connected with said bearing at a point below said shaft, said link extending forwardly with respect to said bearing and having pivot means at its front end for connection with the chassis of a dump truck to hold said bearing substantially vertical when said casing is tilted with the truck body.

WILMER ALBERT LUTZ.

REFERENCES CITED

The following references are of record in the file of this patent:

UNITED STATES PATENTS

| Number | Name | Date |
|---|---|---|
| 454,977 | Orr | June 30, 1891 |
| 659,158 | Schlabach | Oct. 2, 1900 |
| 780,708 | Collins | Jan. 24, 1905 |
| 1,285,183 | Holden | Nov. 19, 1918 |
| 1,928,030 | Putnam | Sept. 26, 1933 |
| 2,180,044 | Frank et al. | Nov. 14, 1939 |